United States Patent [19]

Fanizza et al.

[11] 4,404,588
[45] Sep. 13, 1983

[54] CRT HOLDING ASSEMBLY FOR PROJECTION TELEVISION

[75] Inventors: Michael A. Fanizza, Mt. Prospect; Richard G. Schmid, Glenview, both of Ill.

[73] Assignee: Zenith Radio Corporation, Glenview, Ill.

[21] Appl. No.: 318,309

[22] Filed: Nov. 5, 1981

[51] Int. Cl.³ .................. H04N 5/655; H04N 5/74
[52] U.S. Cl. .................. 358/60; 358/245; 358/249; 358/231
[58] Field of Search .............. 358/60, 64, 231, 237, 358/245, 246, 247, 248, 249, 242

[56] References Cited

U.S. PATENT DOCUMENTS

| | | | |
|---|---|---|---|
| 2,585,746 | 2/1952 | Davis | 358/245 |
| 2,602,112 | 7/1952 | Fisch | 358/245 |
| 2,797,408 | 6/1957 | Greatbatch, Jr. | 358/245 |
| 2,866,187 | 12/1958 | Fisch | 358/245 |
| 2,948,891 | 8/1960 | Smith | 358/249 |
| 3,404,227 | 10/1968 | Alcala | 358/245 |

FOREIGN PATENT DOCUMENTS 598517 2/1948 United Kingdom ................ 358/249

Primary Examiner—Tommy P. Chin

[57] ABSTRACT

To hold three CRTs in proper optical alignment in a projection television system, each of three pods holds one CRT. Each pod includes a cylindrical housing for holding the front piece of a CRT, and a back cover which holds the CRT inside the housing. Preferably, each housing is adapted to hold its CRT at a preselected rotational position and at a preselected tilt angle with respect to a straight ahead optical projection axis.

9 Claims, 15 Drawing Figures

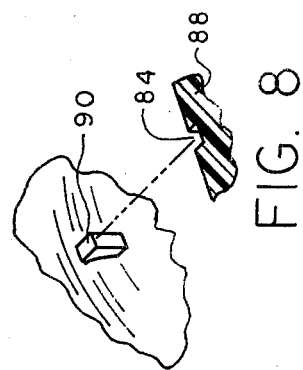
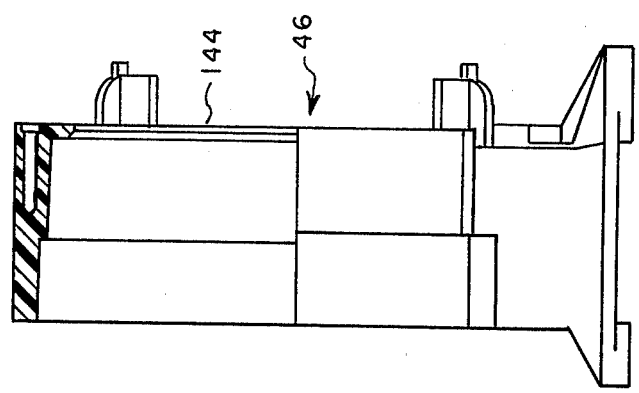
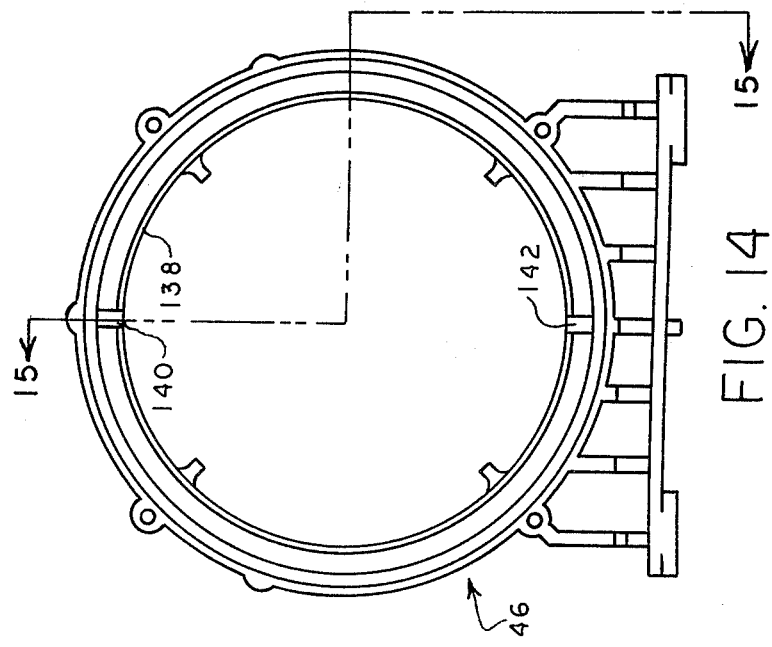

CRT HOLDING ASSEMBLY FOR PROJECTION TELEVISION

BACKGROUND OF THE INVENTION

This invention is generally directed to improvements in projection television systems. It is particularly directed to an assembly for holding three CRTs in optical alignment with a screen on which the CRT images are projected.

As those skilled in the art of projection systems will recognize, it is extremely important that the three CRTs which develop projected images be held in proper alignment with their intended optical axes. Deviations from proper alignment result in a distorted image on the projection screen. Sometimes, even the usual electronic image alignment circuitry is incapable of properly compensating for such distortions. Moreover, the use of electronic alignment circuitry to compensate for optical and mechanical alignment difficulties is time consuming and requires an undesirably high level of complication in the electronic circuitry.

Conventional CRT holding assemblies use metal clamping rings, brackets and the like to hold all three tubes and their associated lenses. Generally, the three tubes and their lenses are spanned by a single bracket. To replace a defective tube, the bracket must be loosened, thereby allowing the non-defective tubes to be inadvertently and unknowingly moved from their factory-aligned positions. Once this occurs, it is very difficult to determine whether the resultant image misregistration is attributable to electronic errors or optical registration errors. Hence, the misregistration is frequently compromised by resetting the electronic alignment circuitry, but its range and capability are normally insufficient for this purpose.

These and similar problems with conventional CRT holding assemblies render CRT alignment and replacement unsatisfactorily difficult, and frequently result in compromised performance.

OBJECTS OF THE INVENTION

It is a general object of the invention to provide an improved CRT holding assembly for use in a projection television system.

It is a more specific object of the invention to provide a CRT holding assembly which permits relatively easy replacement of a defective CRT without disturbing the alignment of other CRTs, and which holds the CRTs in correct alignment with their intended optical axes.

BRIEF DESCRIPTION OF THE FIGURES

The objects stated above and other objects of the invention are set forth more particularly in the following detailed description, and in the accompanying drawings, of which:

FIG. 8 illustrates a pod's CRT indexing groove and a CRT tab which mates with the groove;

FIG. 14 is a rear plan view of the housing for the center pod in FIG. 3; and

FIG. 15 is a view taken along lines 15—15 of FIG. 14.

DESCRIPTION OF THE PREFERRED EMBODIMENT

The preferred CRT holding assembly which is described herein has been designed for use in a particular rear projection television system; nevertheless, various aspects of the invention will be seen to be useful in other projection systems. In order to appreciate the contribution which this holding assembly makes to the over-all projection system, the system itself will be briefly explained.

Figure 1:
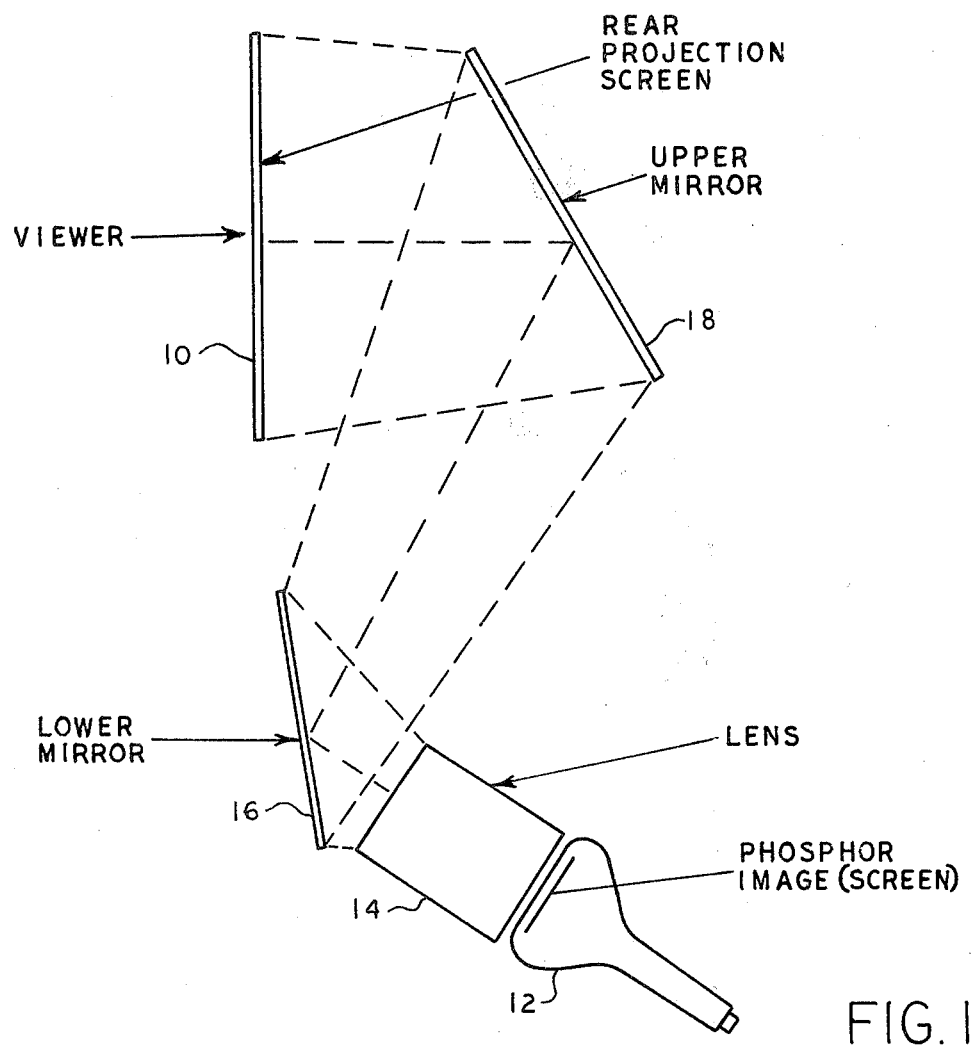
FIG. 1 illustrates an exemplary rear projection television system in which the present CRT holding assembly may be advantageously used.

Referring first to FIG. 1, a simplified view is shown of a rear projection system in which the present CRT holding assembly finds use. As shown, this system includes a rear projection screen 10 on which three electronically formed images are optically combined. The images are generated by a CRT 12 and two additional CRTs which are not shown. The image from the CRT 12 passes through a lens 14 and is projected onto the screen 10 via a folded light path which includes a lower mirror 16 and an upper mirror 18. The images from the other CRTs are also passed through lenses (not shown) and projected onto the screen via the same light path.

In order to provide a properly aligned and undistorted image on the screen 10, the system relies heavily on positioning the CRTs correctly and on optically coupling the CRT's images to the screen in a manner which simplifies the electronics needed to bring the system into registration. Thus, image registration errors become divided into two basic categories, namely optical errors and electronic errors.

Optical errors in this type of system may occur as a result of a CRT or lens being mispositioned, or a misadjustment of the mirrors in the folded light path. If those elements are positioned and aligned correctly so that the optical system is given independent attention, the electronics need not be used to "cover up" for optical errors. Such cover up may be possible except in case of gross optical errors where the range of electronic control is inadequate. Even if the electronic control is adequate to compensate for optical errors, it usually results in a lopsided electronic control range, increased system power, and system biases that do not lend themselves to best over-all system registration, brightness output, or long term stability.

One of the factors which contributes to a properly registered image without the need for complex electronic alignment circuitry is the use in the illustrated system of tilted faceplate CRTs. These CRTs are normally mounted in-line to establish a center CRT and two outboard CRTs. The center CRT is aligned along a straight-ahead optical axis, and the outboard CRTs are canted toward that optical axis to provide converged images on the screen.

To compensate for the distortion which would result from such off-axis projection, the faceplates of the canted (outboard) CRTs are tilted at an angle which corresponds to the cant angle of the off-axis projection. Consequently, image distortions are developed on the screens of the tilted faceplate CRTs, and these distortions compensate for the distortions accompanying off-axis projection.

Figure 2:
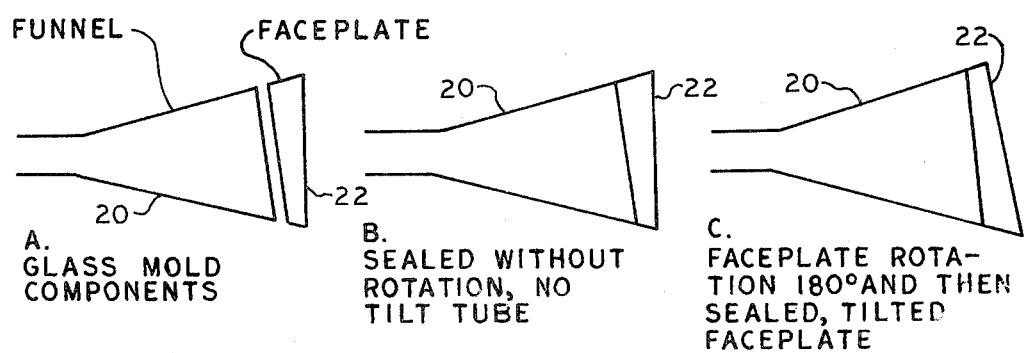
FIG. 2 is a simplified view of a tilted faceplate CRT of the type which the preferred embodiment is intended to hold.

Referring to FIG. 2 for an aid in explaining the nature of a tilted faceplate CRT, the illustrated CRT is made of two pieces, a funnel 20 and a faceplate 22. As shown in view A of FIG. 2, the mating surfaces of the funnel and faceplate are molded on an angle which is selected to be one-half the desired tilt angle. If the funnel and faceplate are joined together as shown in view B, that is, without any relative rotation between the funnel and faceplate, a non-tilted CRT is formed. Such a non-tilted CRT may be used as the center CRT in the projection system.

The two outboard CRTs are formed by rotating their faceplates relative to their funnels and then sealing those components together to form tilted faceplate CRTs as shown in view C of FIG. 2. A fuller discussion of such tilted faceplate CRTs may be found in U.S. Pat. No. 4,274,110, assigned to the assignee of the present invention.

Figure 3:
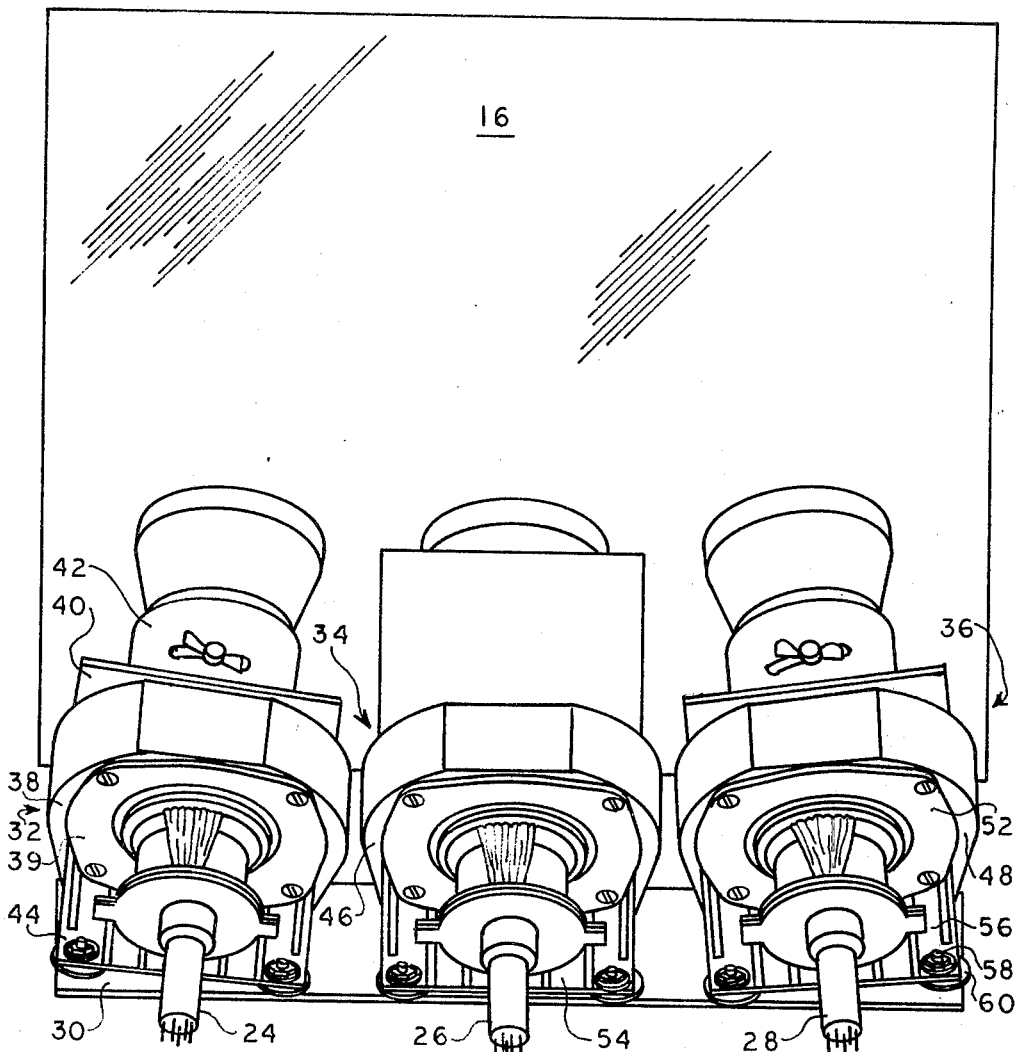
FIG. 3 is a perspective view of a preferred CRT holding assembly according to the invention, illustrating a cluster of three CRT pods, the CRTs and lenses which are held by the pods, and a mirror on which the CRT images are projected.

Referring now to FIG. 3, a cluster of three CRTs 24, 26 and 28 is shown mounted on a platform 30 so as to project the image developed by the center CRT straight ahead to the mirror 16, and so that CRTs 24 and 28 are canted toward the optical path of CRT 26. Thus, CRTs 24 and 28 project off-axis images onto the mirror 16. The CRTs 24 and 28 are preferably tilted faceplate CRTs of the type discussed above.

To independently hold each of the CRTs in a preassigned position for best optical projection, the CRTs are held and mounted on the platform 30 by means of three separate pods 32, 34 and 36. The pod 32 includes a generally cylindrical, hollow housing 38 in which the CRT 24 is held. Although they are not shown in FIG. 3, the housing 38 includes a front opening through which the CRT's image projects and a rear opening through which the CRT 24 is inserted into the housing 38. A cover 39 mates with the rear of the housing 38 and has a central aperture therein which is sized to fit over the neck of the CRT 24.

The housing 38 also includes means for supporting a heat sink 40 in thermal contact with the faceplate of the CRT 24, and means for supporting a lens 42.

Integrally molded with the housing 38 is a base plate 44 which secures the pod 32 to the platform 30 by means of four bolts, two of which are illustrated.

The pods 34 and 36 are similar to the pod 32 in that they respectively include housings 46 and 48, covers 50 and 52, and intregrally molded baseplates 54 and 56 for mounting the pods to the platform 30. These pods are similar in function to the pod 32 and similar in structure except that the pod 34 holds a straight faceplate CRT and pods 32 and 36 hold CRTs whose faceplates are tilted in opposite directions.

Associated with each pod is leveling means for adjusting the optical centering of a CRT to provide a converged image on the viewing screen. This leveling means is preferably included as a part of the structure which holds a pod to the base 30. In the illustrated embodiment, the bolts such as bolt 58 capture a leveling wheel 60 between the platform 30 and the pod's baseplate, as shown more clearly in FIG. 4.

Figure 4:
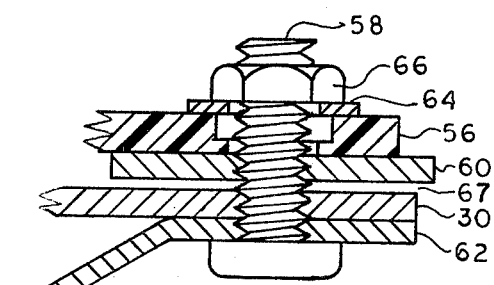
FIG. 4 is a sectional view of a leveling wheel associated with each pod.

In FIG. 4, the bolt 58 passes through a bracket 62 which may support the platform 30. The leveling wheel 60 is situated above the platform 30, and the baseplate 56 of the pod 36 is situated between a washer 64 and the leveling wheel 60. A nut 66 holds this entire assembly securely together.

To adjust the attitude of the pod 36 and its CRT 28, the leveling wheel is manually rotated to vary a space 67 between the baseplate 56 and the platform 30 and, when the space is adjusted to its desired height, the nut 66 is tightened. Each pod preferably includes at least two of these leveling wheel assemblies as shown in less detail in FIG. 3.

Figure 7:
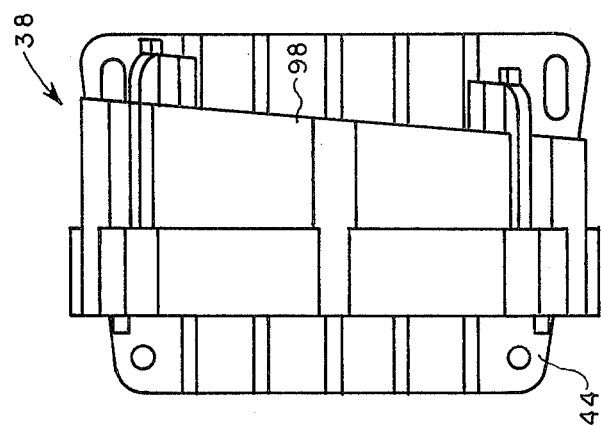
FIG. 7 is a top plan view of the pod shown in FIGS. 5 and 6.
Figure 6:
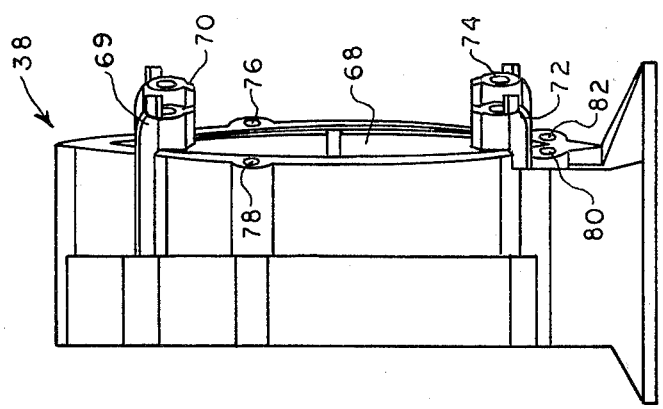
FIG. 6 is a perspective view of the side and front of the pod shown in FIG. 5.
Figure 5:
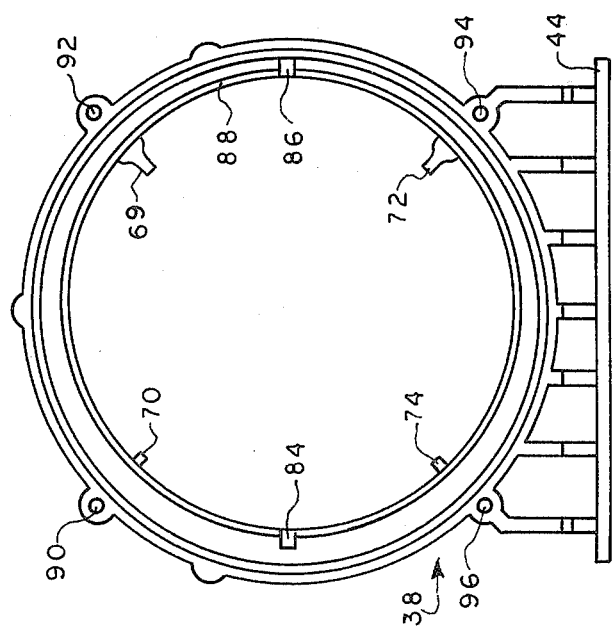
FIG. 5 is a rear plan view of the housing for the leftmost pod in FIG. 3.

Referring now to FIGS. 5, 6, and 7, the housing 38 for the leftmost pod 32 is shown in greater detail. As shown most clearly in FIG. 6, the housing 38 includes a front opening 68 around which four fingers 69, 70, 72 and 74 are disposed. These fingers extend outwardly from the housing to engage and hold the lens 42 in selected optical alignment with a CRT screen (FIG. 3). Holes in the heat sink 40 (FIG. 3) permit these fingers to pass through the heat sink.

To hold the heat sink 40, the housing includes four holes 76, 78, 80 and 82 for receiving self-threading screws which secure the heat sink to the housing and hold it in contact with the CRT's faceplate.

As discussed previously, the outboard pods hold tilted faceplate CRTs. These CRTs must be held at the proper rotational positions in their respective pods so that the CRT images are properly projected onto the viewing screen. Because the CRTs in the outboard pods have different tilts to their faceplates (the center CRT has no tilt), they must be held at different rotational positions. The center CRT must be held in its pod without tilt.

Toward this end, each pod includes indexing means for holding its CRT at a preselected rotational position. In the illustrated embodiment, this indexing means includes at least one and preferably two indexing slots 84, 86 (FIG. 5) in a circular flange 88. This flange is located at the front of the housing 38 and extends radially inwardly thereof. When a CRT is seated in the housing, the CRT's faceplate abuts the flange 88 so that the CRT's faceplate is substantially flush with the housing's front opening 68.

The CRT which is held by the housing will have one or more indexing tabs which project outwardly from the CRT's glass envelope. These tabs, such as the tab 90 in FIG. 8, are mated with the indexing slots to hold the CRT at the desired rotational positions.

Referring to FIG. 5, the rear of the housing 38 includes threaded holes 90, 92, 94 and 96 for receiving screws which secure the back cover to the housing.

Another important aspect of the housings relates to the way in which their front openings are canted or tilted. As shown most clearly in FIG. 7, the front opening of the housing 38 is tilted, as shown by the contour line 98. That is, the front of the housing is molded at an angle which matches the tilt embodied in the faceplate it holds.

Figure 11:
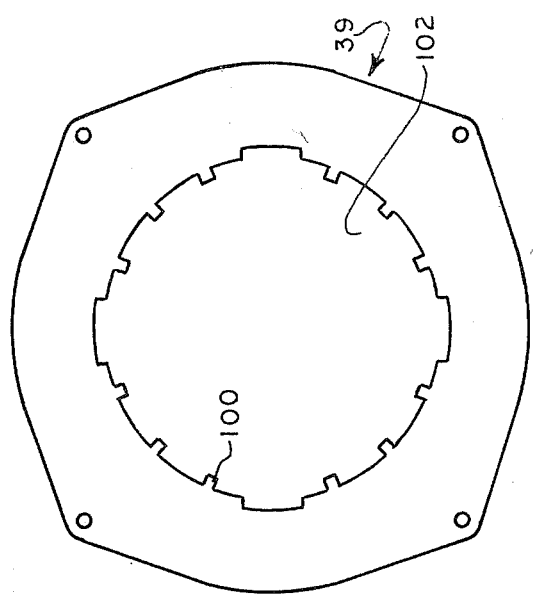
FIG. 11 is a rear view of the back cover shown in FIG. 9.
Figure 10:
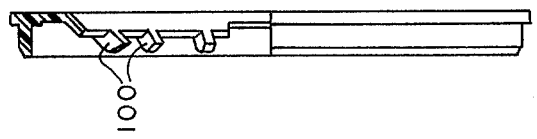
FIG. 10 is a view taken along lines 10—10 of FIG. 9.
Figure 9:
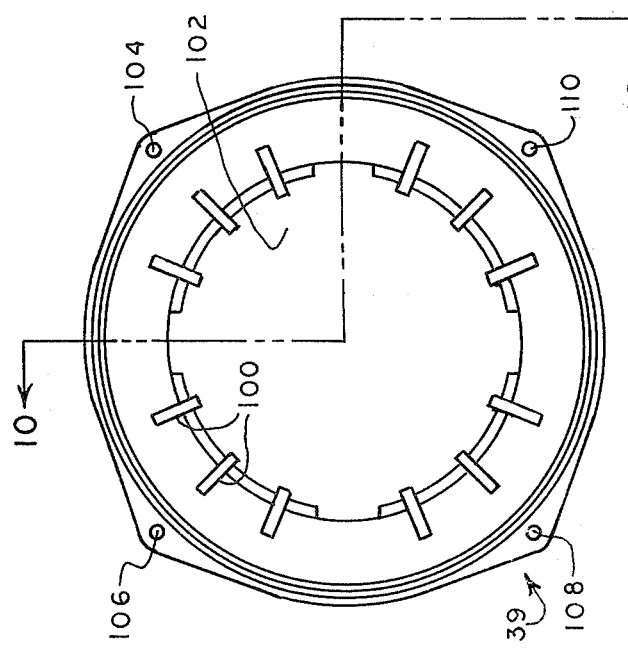
FIG. 9 is a front plan view of a pod's back cover.

The rear covers for the three housings may be identical and constructed as shown in FIGS. 9, 10 and 11. The side of the cover 39 which mates with its housing includes ribs 100 which extend radially inward toward the cover's central aperture 102. These ribs are included to engage and center a CRT within its pod. The cover may also include holes 104, 106, 107 and 110 through which screws may pass to secure the cover in its housing.

Figure 12:
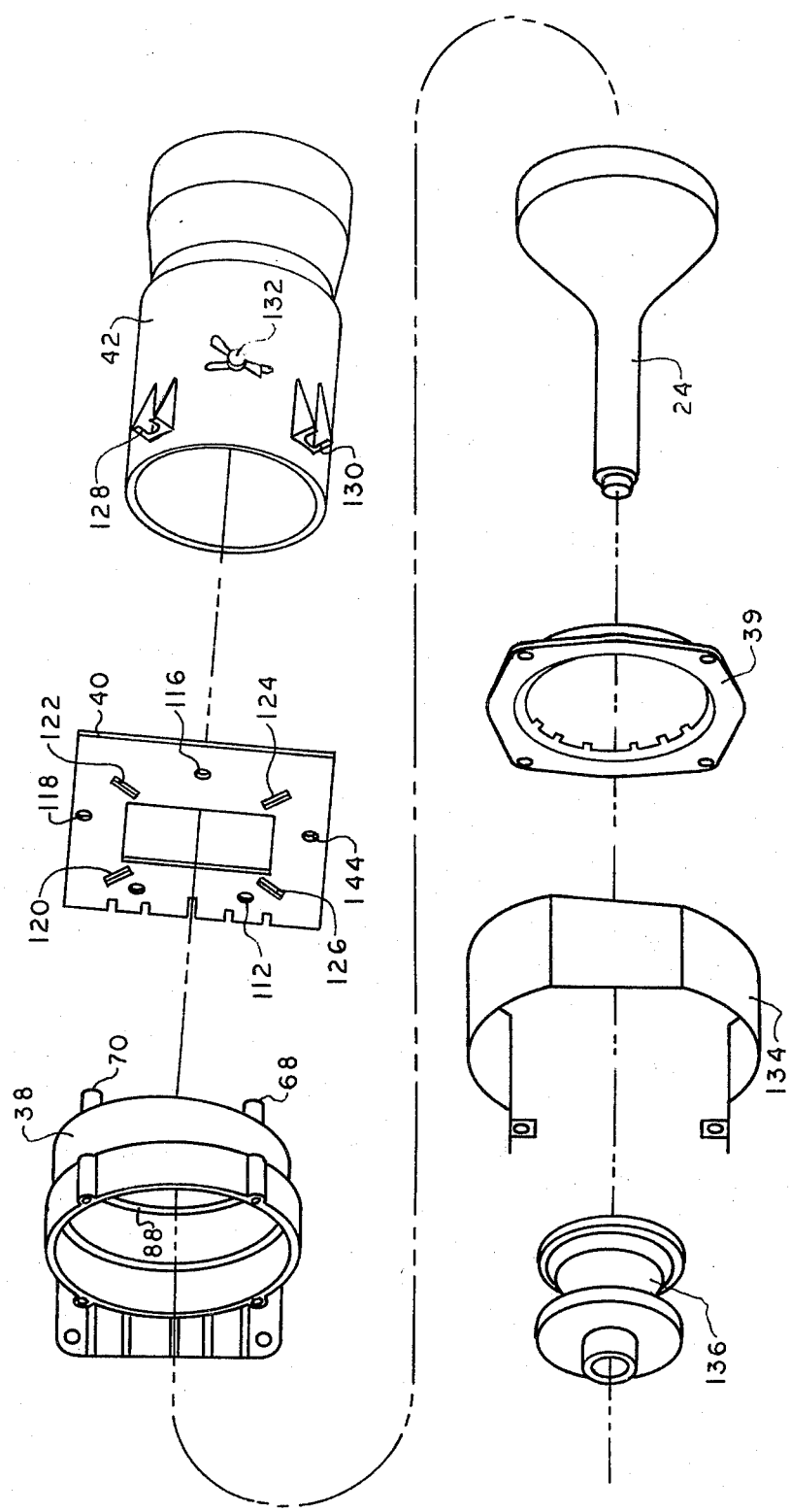
FIG. 12 is an exploded view of the leftmost pod shown in FIG. 3.

Referring to FIG. 12, an exploded view is shown of the pod 32, its CRT, heat sink, and lens. In assembly, the heat sink 40 is mounted to the front of the housing 38 via securing holes 112, 114, 116 and 118 so that the housing's fingers pass through holes 120, 122, 124 and 126. The lens 42 is positioned over the heat sink by flanges 128 and 130 which engage fingers 68 and 70 on the housing and then secured by self-threading screws which engage holes in finger 68 and 70. Focusing the lens 42 may be effected by an adjustment knob 132 thereon.

The CRT is inserted into the housing 38 and secured therein by the back cover 39. A radiation shield 134 may be included to surround the housing 38. A yoke assembly 136 is normally mounted on the neck of the CRT 24.

Figure 13:
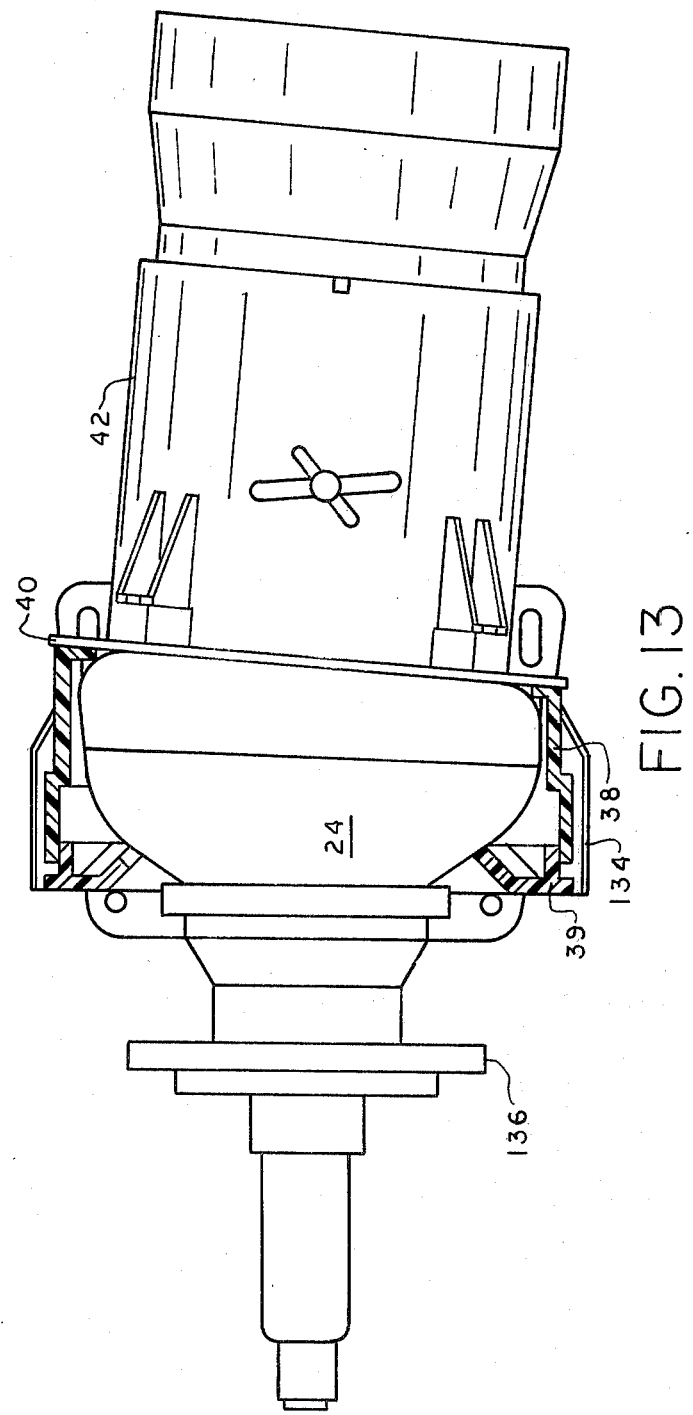
FIG. 13 is a top view, partly in section, of the leftmost pod in FIG. 3, shown mated with a CRT and lens.

As shown by the completed assembly depicted in FIG. 13, the tilt of the CRT's faceplate is held in matching alignment with the front opening of the housing 38. In addition, the heat sink 40 is held in contact with the CRT's faceplate, thereby allowing operation at increased power levels.

The housings for the three pods are substantially identical except for the tilt of their front openings and the location of their indexing slots. These parameters for the center pod's housing are shown in FIGS. 14 and 15 to which reference is now made.

As shown in FIG. 14, a circular flange 138 around the front opening of the center housing 46 includes indexing slots 140 and 142. These slots are intended to receive indexing tabs carried by a CRT to hold the CRT at a given rotational position. Note that these slots occupy different angular positions than the slots 84 in the housing 38 (FIG. 5). The indexing slots included in the housing 48 may be positioned at yet another angular disposition.

Because the center CRT of the cluster does not have a tilted faceplate, the front opening of the housing 46 is also untilted. This is shown best in FIG. 15 wherein the contour line 144 indicates that the front opening of housing 46 lies in a plane which is perpendicular to the straight-ahead optical axis of the center CRT.

The other illustrated components of the housing 46 are similar to those discussed previously and, therefore, do not require further explanation.

Among the advantages of the present CRT holding assembly is that each CRT is secured in position independently of the other CRTs. Thus, a defective CRT may be replaced without disturbing the alignment of the other CRTs.

In addition, the present assembly makes it possible to pre-align all the pods before the CRTs are secured in them. Once properly aligned, most optical errors are eliminated and electronic errors may be eliminated independently.

As an example of the way in which optical alignment may be achieved, the following procedure is suggested. The cluster bed is completely assembled except for the CRTs. The three pods are adjusted for azimuth and elevation by means of the leveling wheels. During this adjustment, ideal optical images in the form of back lighted film transparencies, one mounted in each pod, are used to project a crosshatch image on the viewing screen. These transparencies include the distortions generated by the tilted faceplate CRTs.

With the transparencies mounted so that their images are positioned at the same point in the pods as that normally assumed by the CRT image plane, the pods are aligned and adjusted to provide a converged image on the viewing screen. The transparencies may now be replaced by the CRTs with the certainty that optical alignment is complete except for adjustment of the mirrors.

The alignment thus provided assures that any other image errors are due to electrical alignment which is then more easily attained. Thus, optical and electronic adjustment may be easily done independently of each other to achieve an accurate bore-sighted condition.

Once proper alignment has been achieved, the projected image tends to remain in registration because optical alignment is substantially independent of environmental conditions. Improved reliability, fewer service calls, and ease of electronic image alignment are direct results of this holding assembly.

Although the invention has been described in terms of a preferred embodiment, it will be obvious to those skilled in the art that many modifications and alterations may be made without departing from the invention. Accordingly, it is intended that all such modifications and alterations be considered as within the spirit and scope of the invention defined by the appended claims.

What is claimed is:

1. In a television system having three CRTs each including an integral indexing tab, two of which CRTs have tilted faceplates, each of which faceplates is tilted opposite to the other, and wherein the image generated by each of said CRTs is projected through an associated lens onto a viewing screen, an assembly for holding said CRTs in proper optical alignment, comprising:
   a platform;
   three pods adapted to be mounted on the platform, each of said pods comprising:
      a generally cylindrical, hollow, one piece, non-conductive housing defining a generally circular rear opening for receiving the front piece of a CRT and defining a front opening through which the CRT's image projects and, including indexing means engageable with the indexing tab of said received CRT for holding that CRT at a preselected rotational position;
      said housing further including means for supporting said associated lens in a selected optical alignment relative to the faceplate of said received CRT;
      a cover having a central aperture therein sized to fit over a CRT neck, said cover being adapted to engage the funnel portion of the CRT and to mate with the rear opening of said housing so that the screen of said received CRT is substantially flush with the front opening of said housing.

2. An assembly as set forth in claim 1 wherein each said pod cover includes ribs extending radially inwardly toward its central aperture for engaging said CRT funnel portion for holding and centering a CRT within its associated pod.

3. An assembly as set forth in claim 1 wherein said front openings of two of said housings are tilted for holding CRTs whose faceplates are correspondingly tilted, and wherein said indexing means in each of said two housings serves to hold an associated CRT at a preselected rotational position so as to match the faceplate tilt of its associated CRT to the tilt of said front opening of its associated housing.

4. An assembly as set forth in claim 3 wherein said pods are mounted on said platform in-line to establish a center pod flanked by two outboard pods, and wherein said center pod is mounted with its front opening straight ahead along a center optical axis, and wherein said two outboard pods are canted inwardly toward said optical axis.

5. An assembly as set forth in claim 1 wherein each of said pod housings includes a circular flange which extends radially inwardly of the housing to provide an abutment for the screen of a CRT, and wherein said flange includes said indexing means which comprises a slot for mating with said indexing tab on said received CRT to hold said CRT at a selected rotational position.

6. An assembly as set forth in claim 5 wherein each of said pods includes a base plate which is integrally molded with said pod's housing for mounting said pod on said platform.

7. An assembly as set forth in claim 1 which further includes leveling means associated with each said pod for adjusting the optical centering of said CRTs to provide a coverged image on said viewing screen.

8. In a rear projection television system employing three CRTs, two of which CRTs have tilted faceplates and having a heat sink for each CRT for conducting heat therefrom, and three lenses for focusing assigned ones of the images generated by said CRTs onto a viewing screen, an assembly for holding the CRTs, the lenses and the heat sinks, comprising:

a platform;

three pods, each adapted to receive and hold a CRT and adapted to be mounted on the platform in-line to establish a center pod flanked by two outboard pods, each pod including:

a generally cylindrical, hollow, one piece, non-conductive housing defining a generally circular rear opening for receiving the front piece of a CRT and defining a front opening through which the CRT's image projects;

the housing associated with the center pod being situated with its front opening straight ahead along a center optical axis;

the housings associated with the outboard pods being canted inwardly toward said optical axis, having front openings which are tilted for holding CRTs whose faceplates are correspondingly tilted, and having indexing means for holding their CRTs at a preselected rotational position so as to match the CRT faceplate tilt to the tilt of the housing's front openings;

each housing carrying means for holding a heat sink in thermal contact with a CRT faceplate and also carrying means for holding an assigned one of said lenses in a selected optical alignment with its associated CRT faceplate;

each pod further including a cover having a central aperture therein which is sized to fit over a CRT neck, said cover being adapted to mate with the rear opening of its associated housing for holding the CRT in the housing so that the CRT's screen is substantially flush with the front opening of the housing, each cover also having ribs which extend radially inwardly toward the cover's central aperture for engaging and centering a CRT within a pod.

9. An assembly as set forth in claim 8 wherein said means for holding said lens in a selected optical alignment with a CRT faceplate comprises fingers extending axially outward from said front opening of said housing and passing through said heat sink so that said heat sink is interposed between said CRT faceplate and said lens.

* * * * *